US012308418B2

(12) United States Patent
Jung et al.

(10) Patent No.: US 12,308,418 B2
(45) Date of Patent: May 20, 2025

(54) SECONDARY BATTERY ACTIVE MATERIAL

(71) Applicant: L&F CO., LTD., Daegu (KR)

(72) Inventors: Hye Yun Jung, Daegu (KR); Sung Kyun Chang, Daegu (KR); Sang Hoon Jeon, Daegu (KR); Sun Hye Lim, Daegu (KR); Jae Yeoung Park, Daegu (KR); Doe Hyoung Kim, Daegu (KR)

(73) Assignee: L&F CO., LTD., Daegu (KR)

( * ) Notice: Subject to any disclaimer, the term of this patent is extended or adjusted under 35 U.S.C. 154(b) by 775 days.

(21) Appl. No.: 17/632,305

(22) PCT Filed: Aug. 6, 2020

(86) PCT No.: PCT/KR2020/010372
§ 371 (c)(1),
(2) Date: Jun. 27, 2022

(87) PCT Pub. No.: WO2021/025479
PCT Pub. Date: Feb. 11, 2021

(65) Prior Publication Data
US 2023/0074377 A1   Mar. 9, 2023

(30) Foreign Application Priority Data

Aug. 7, 2019  (KR) .................. 10-2019-0095832

(51) Int. Cl.
*H01M 4/00* (2006.01)
*H01M 4/36* (2006.01)
(Continued)

(52) U.S. Cl.
CPC .......... *H01M 4/364* (2013.01); *H01M 4/505* (2013.01); *H01M 4/525* (2013.01); *H01M 10/052* (2013.01)

(58) Field of Classification Search
CPC ...... H01M 4/505; H01M 4/366; H01M 4/131; H01M 4/525
See application file for complete search history.

(56) References Cited

U.S. PATENT DOCUMENTS

2010/0209771 A1 †  8/2010  Shizuka
2018/0261835 A1     9/2018  Ogata et al.

FOREIGN PATENT DOCUMENTS

CN   107591519 A  †  1/2018
CN   112151775 A  † 12/2020
(Continued)

OTHER PUBLICATIONS

Blangero et al., Stoichimetrically Controlled Lithium Cobalt Oxide Based Compounds, Jan. 1, 2013, See the Abstract. (Year: 2013).*
(Continued)

*Primary Examiner* — Anca Eoff
*Assistant Examiner* — Monique M Wills
(74) *Attorney, Agent, or Firm* — LEX IP MEISTER, PLLC

(57) ABSTRACT

Disclosed is an active material for a secondary battery, the active material containing aggregates, each including a plurality of single particles, or a mixture of the aggregates with non-aggregated single particles, the active material including a first region having a relatively high content of an additional element (X) and a second region having a relatively low content of the additional element (X), wherein the first region is at least one region of a grain boundary formed whereby the surfaces of the single particles constituting the aggregate contact one another and a void (pore or gap) between the single particles, and/or a surface region of each single particle, wherein the additional element (X) includes
(Continued)

at least one selected from the group consisting of Zr, Ti, Al, W, B, P, Mn, Ni, Mg, Cr, Ca, V, Sr, Y, F, Zn, Ga, Sn, Ru, Ce, La, and Si.

20 Claims, 15 Drawing Sheets

(51) Int. Cl.
*H01M 4/505* (2010.01)
*H01M 4/525* (2010.01)
*H01M 10/052* (2010.01)

(56) References Cited

FOREIGN PATENT DOCUMENTS

| | | | | |
|---|---|---|---|---|
| JP | 2016139583 | | 8/2016 | |
| JP | 2016207635 | | 12/2016 | |
| KR | 20170063395 | | 6/2017 | |
| KR | 20190024680 | | 3/2019 | |
| KR | 201901117199 | A † | 10/2019 | |
| TW | 201300320 | A * | 1/2013 | ............ H01M 4/505 |

OTHER PUBLICATIONS

Cheng et al., "Realizing superior cycling stability of Ni-Rich layered cathode by combination of grain boundary engineering and surface coating", 1-8, May 10, 2019, Nano Energy (Elsevier), internet.†

* cited by examiner
† cited by third party

[FIG. 1]
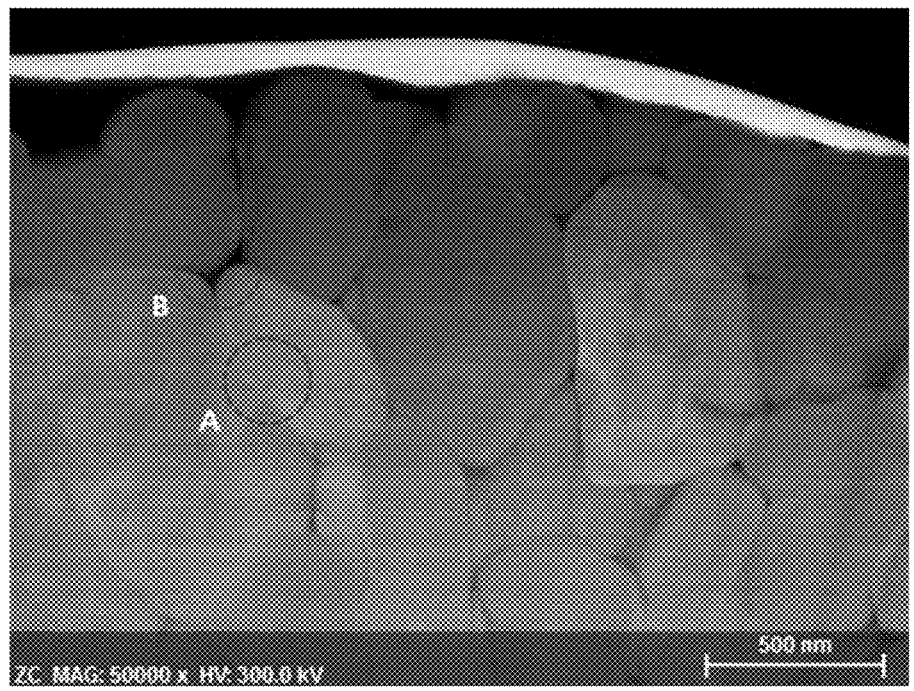
[FIG. 2]
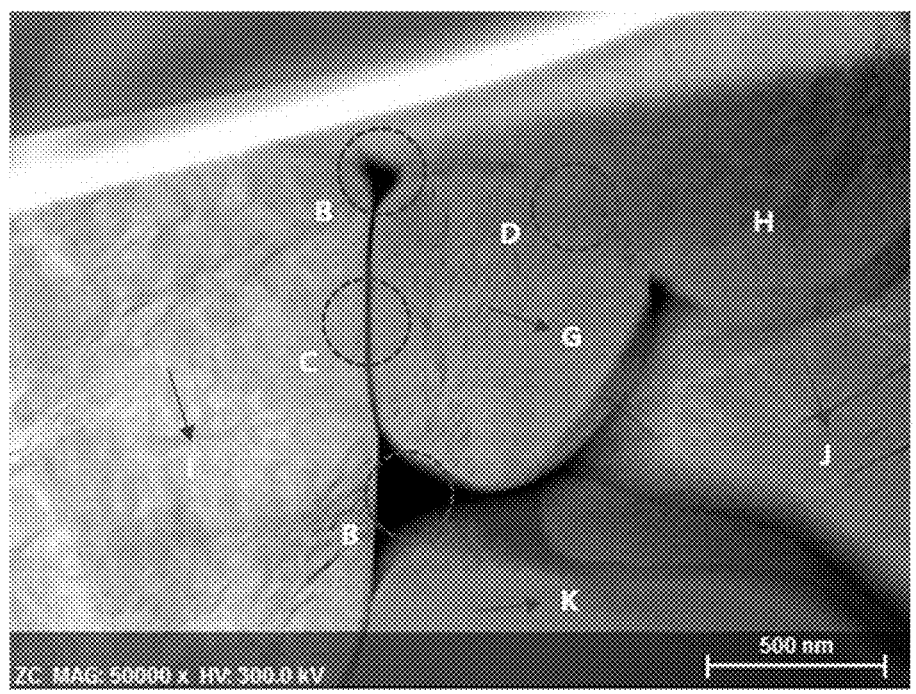

[FIG. 3]
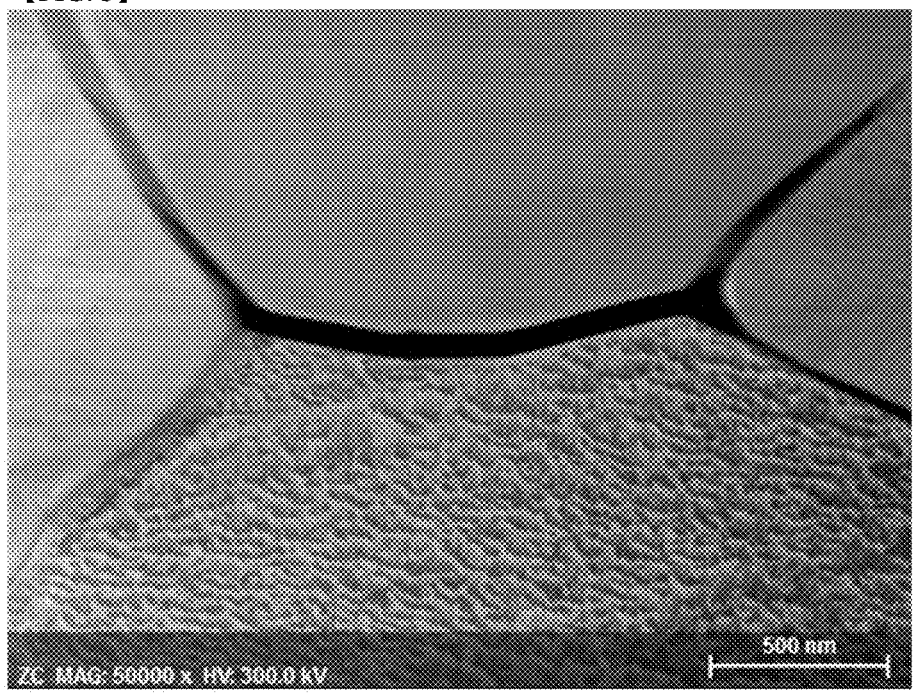
[FIG. 4a]
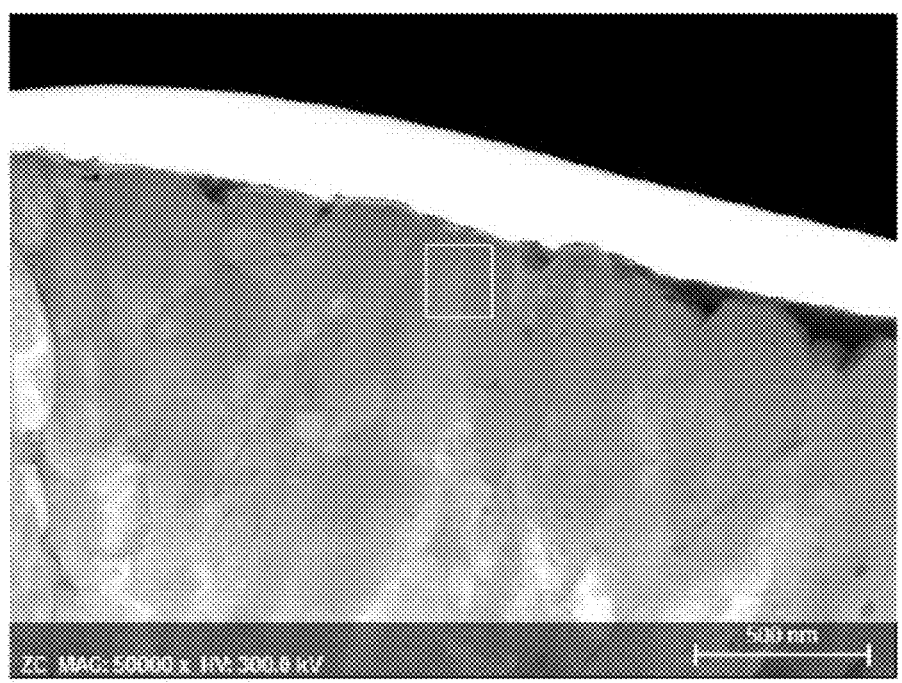

[FIG. 4b]
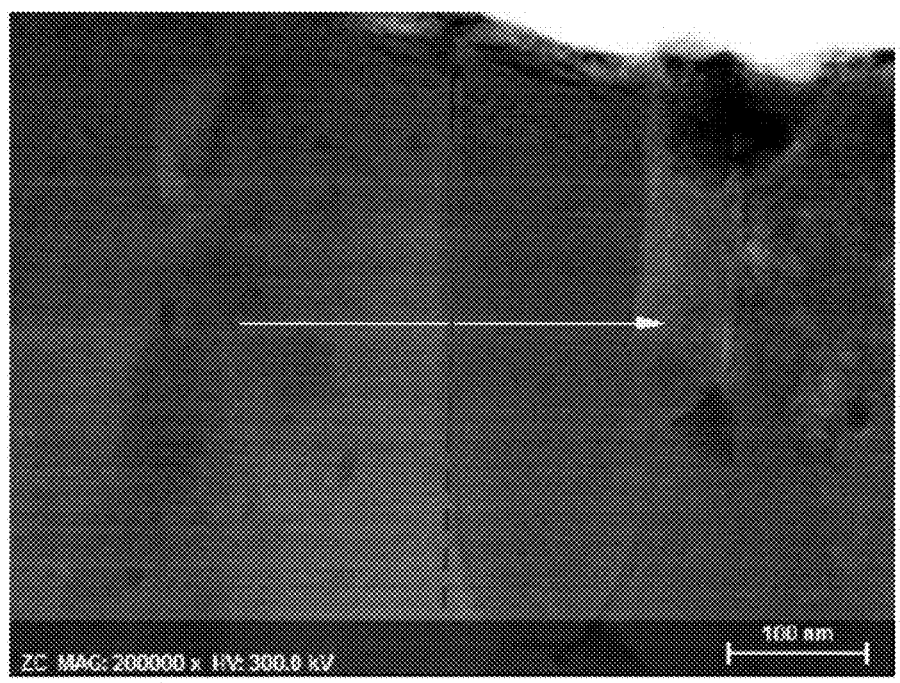
[FIG. 5a]
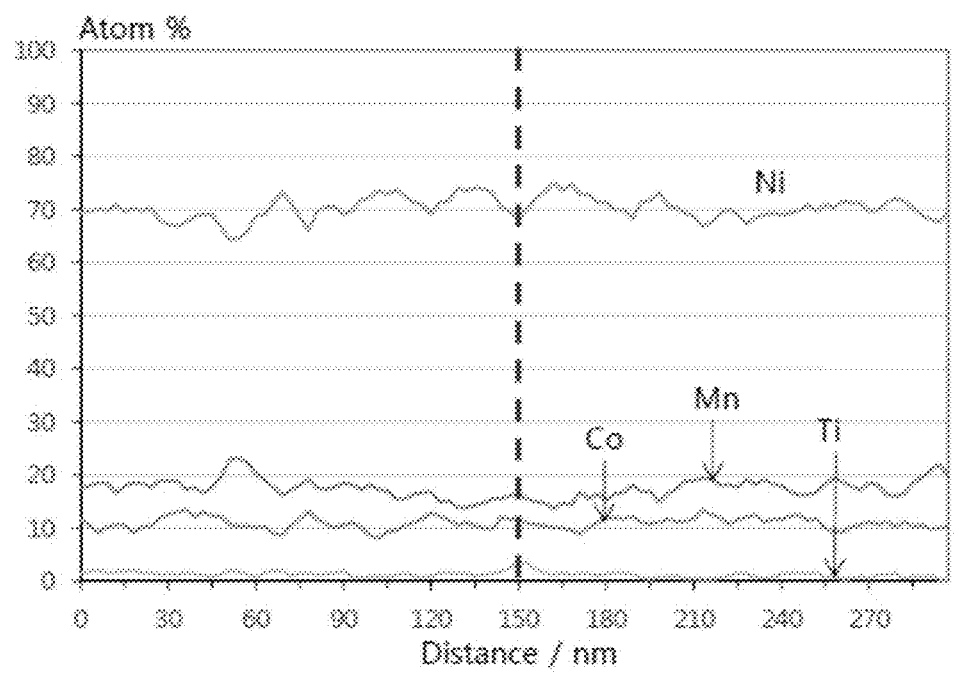

[FIG. 5b]
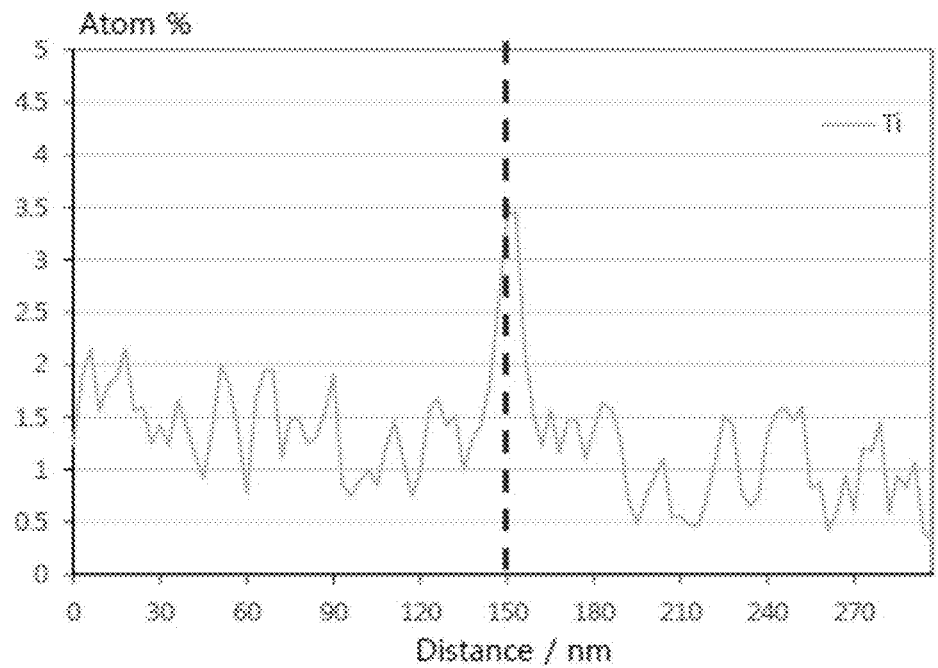
[FIG. 6]
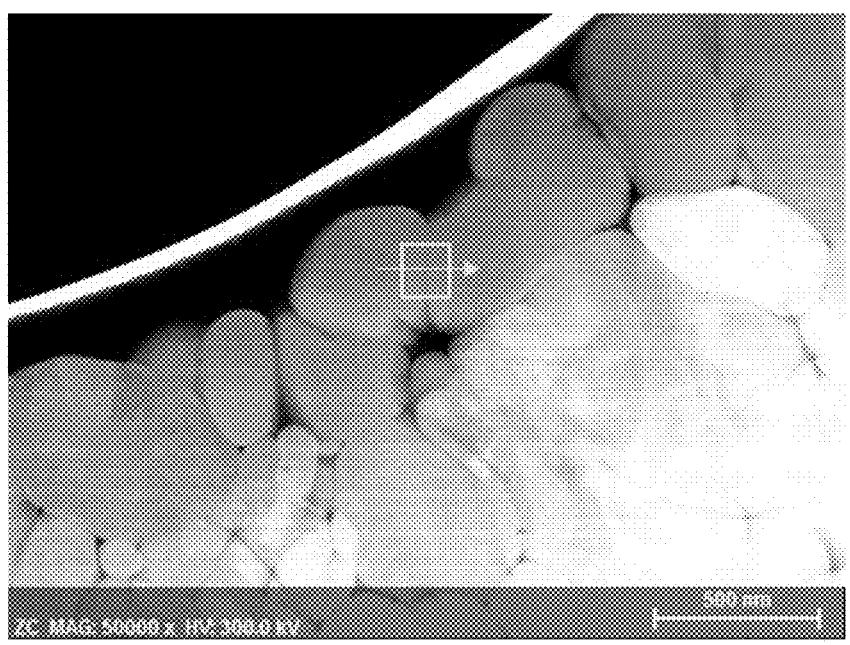

[FIG. 7a]
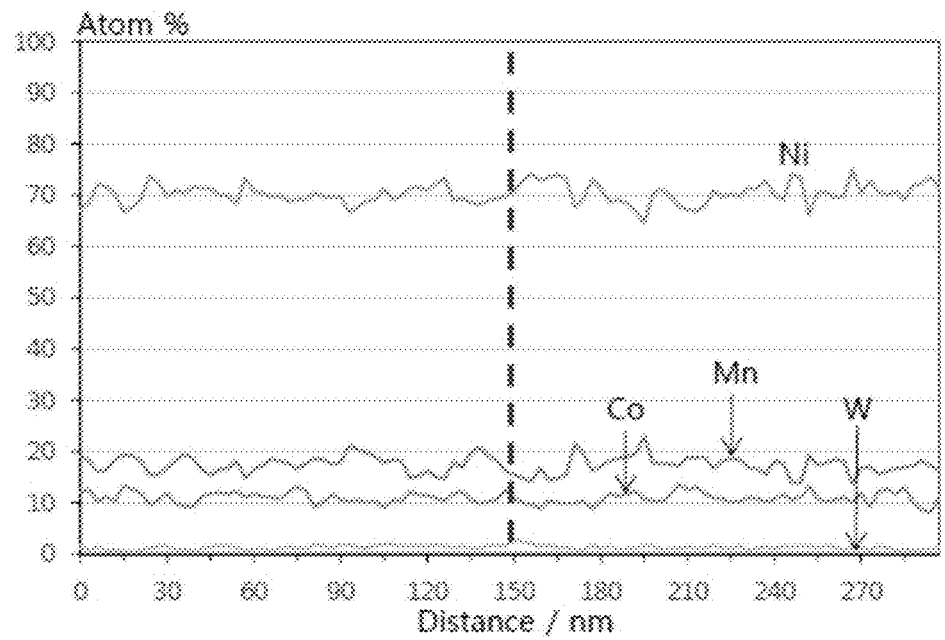
[FIG. 7b]
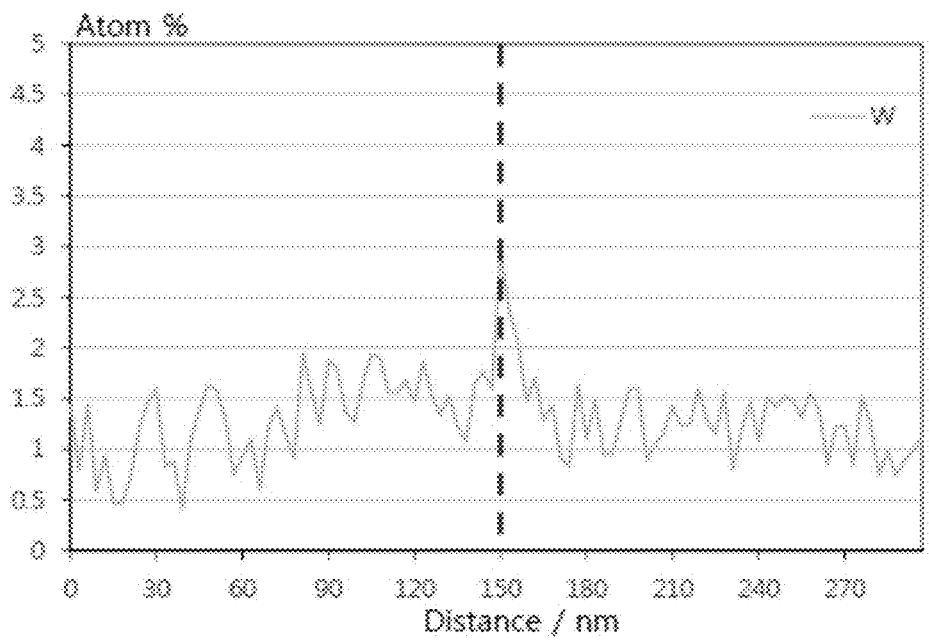

[FIG. 8a]
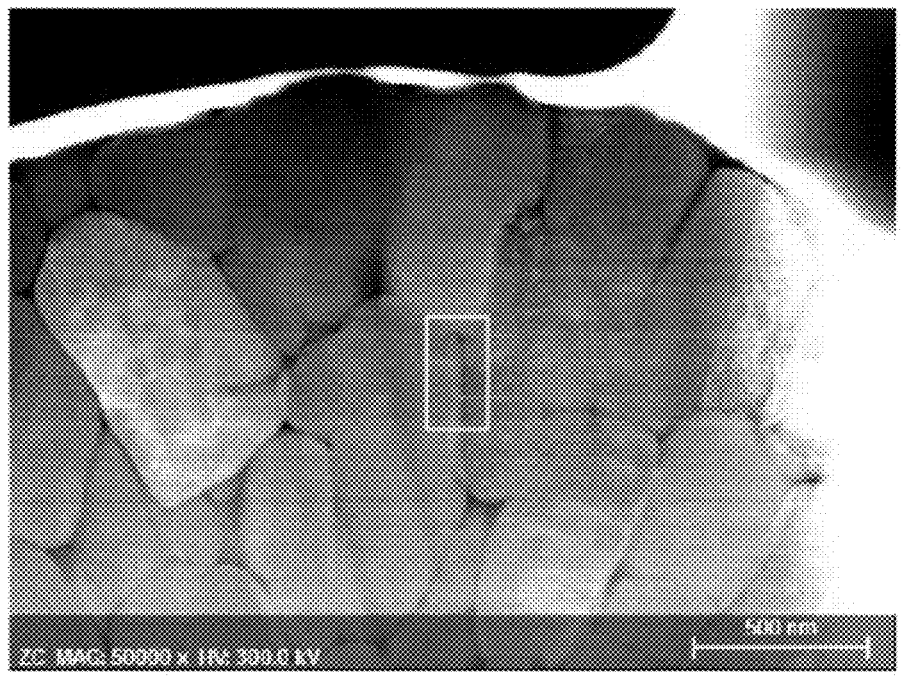
[FIG. 8b]
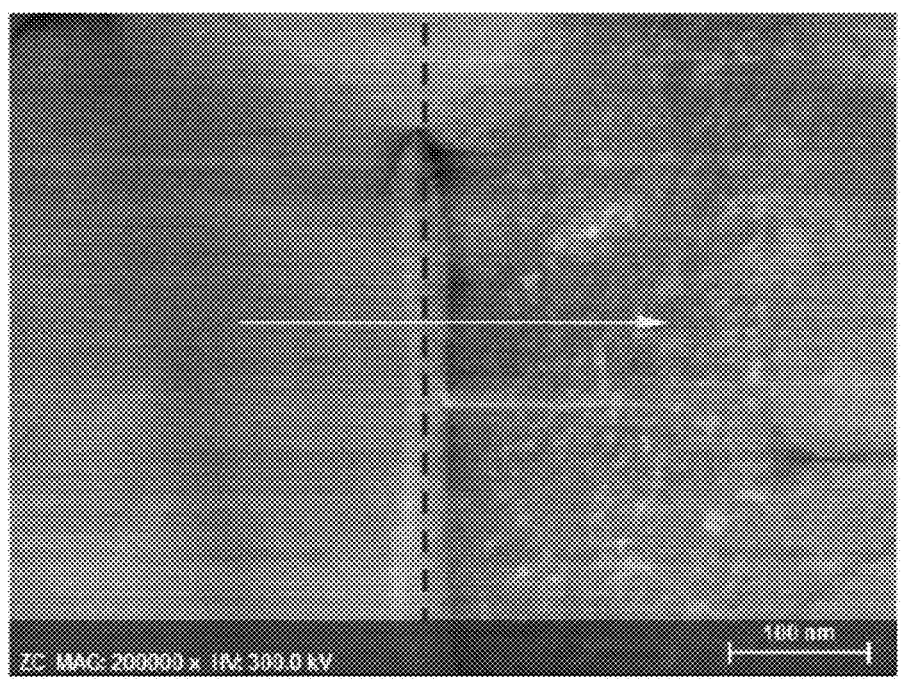

[FIG. 9a]
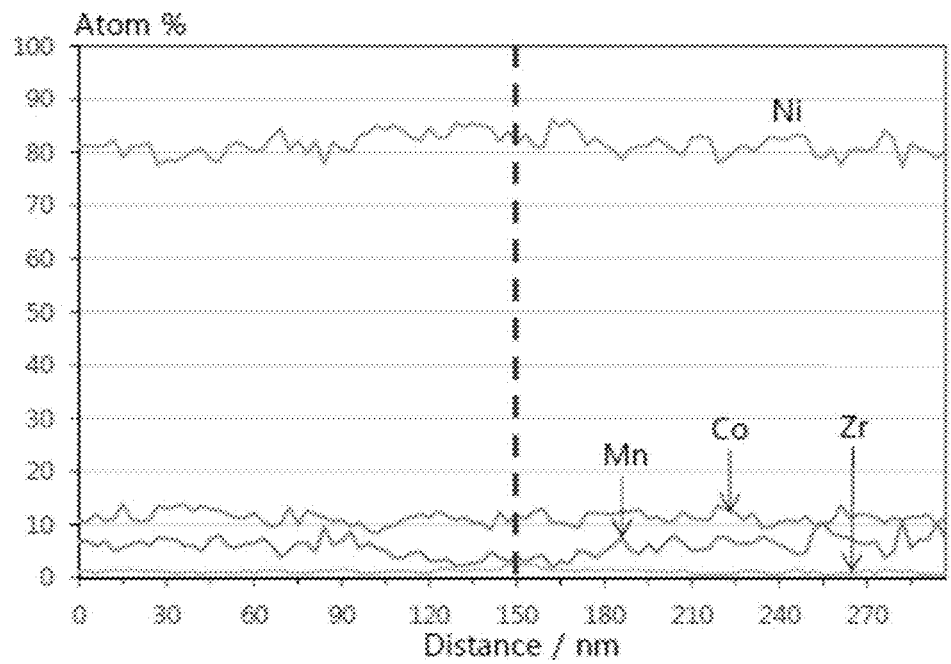
[FIG. 9b]
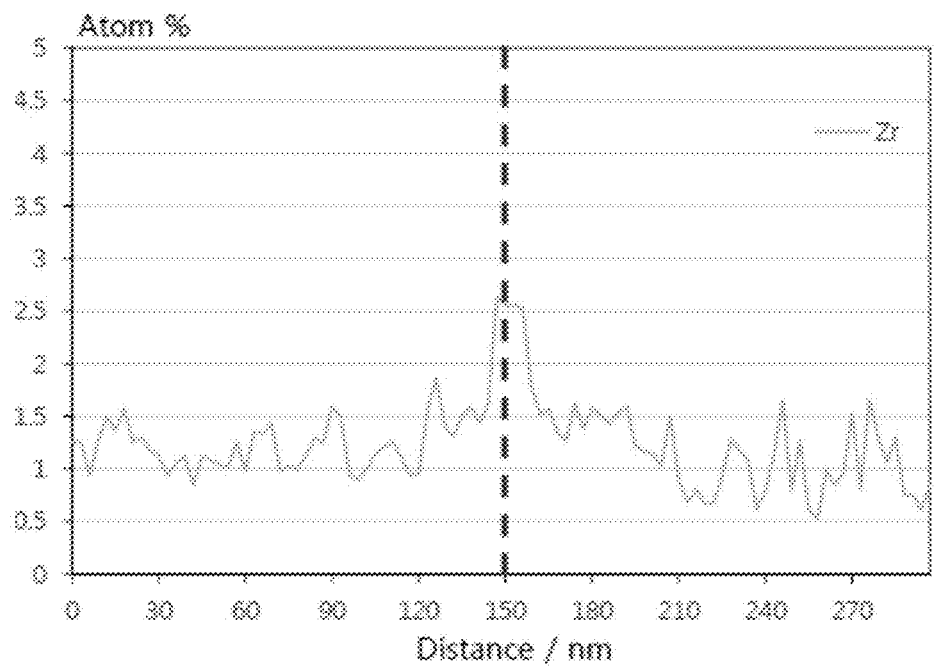

[FIG. 10a]
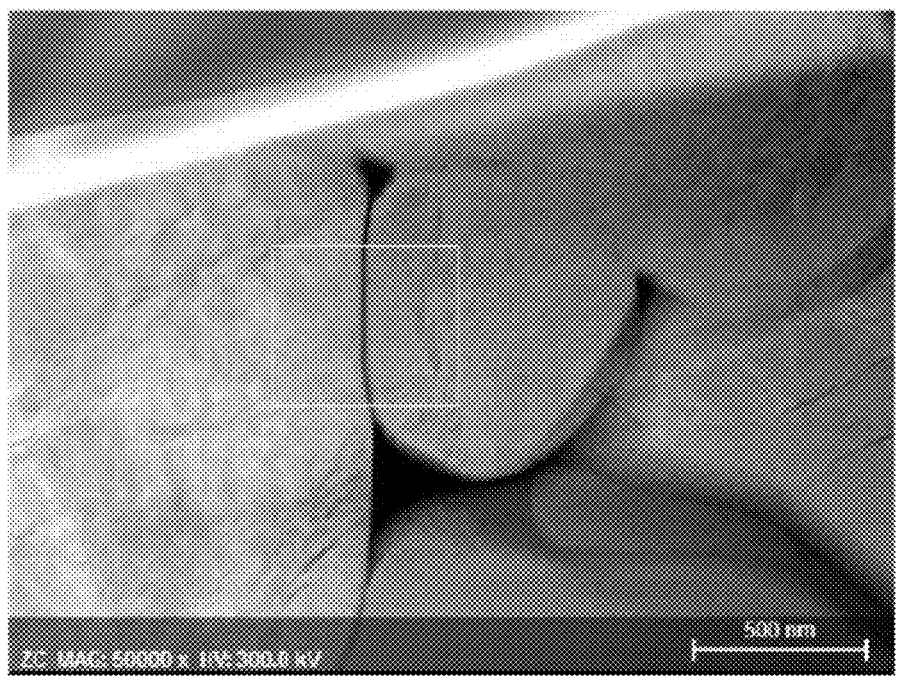
[FIG. 10b]
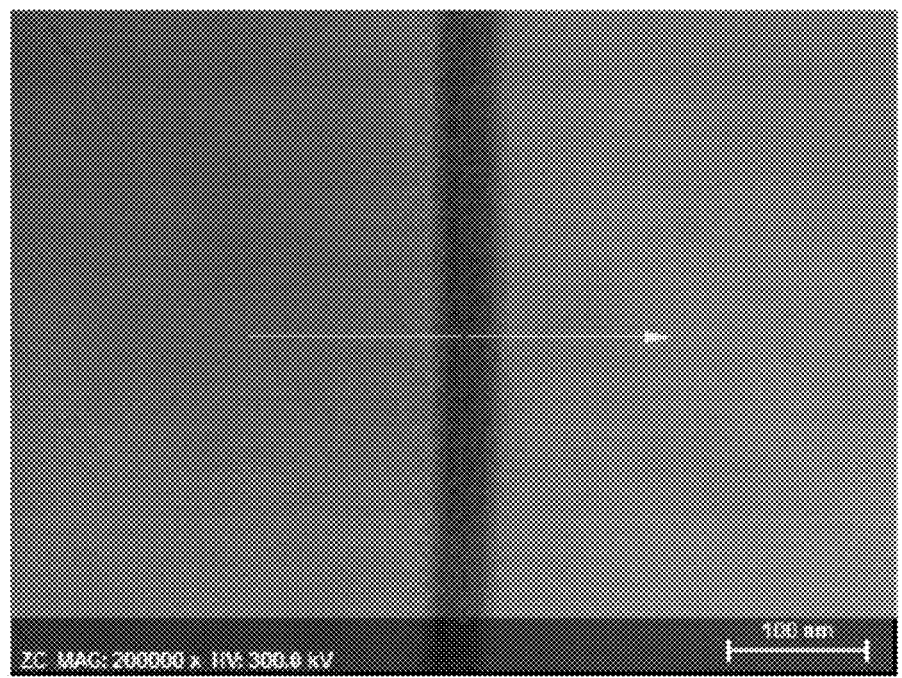

[FIG. 11a]
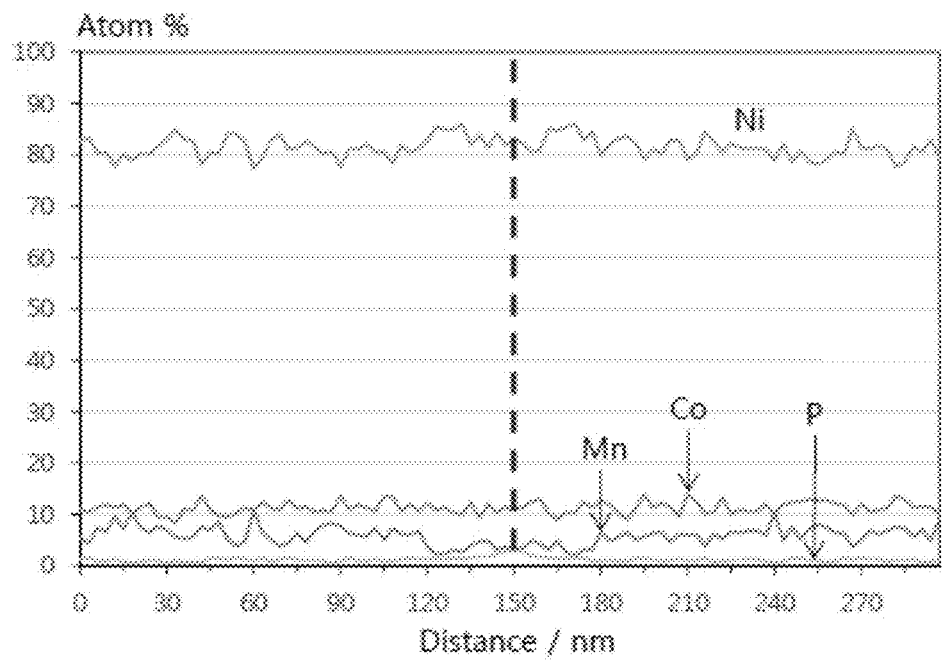
[FIG. 11b]
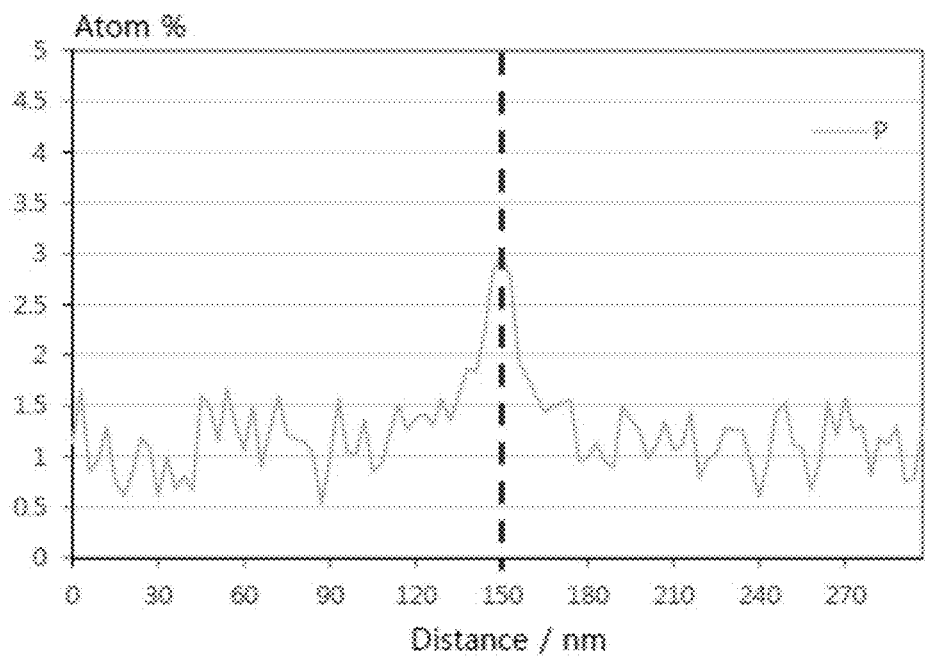

[FIG. 12a]
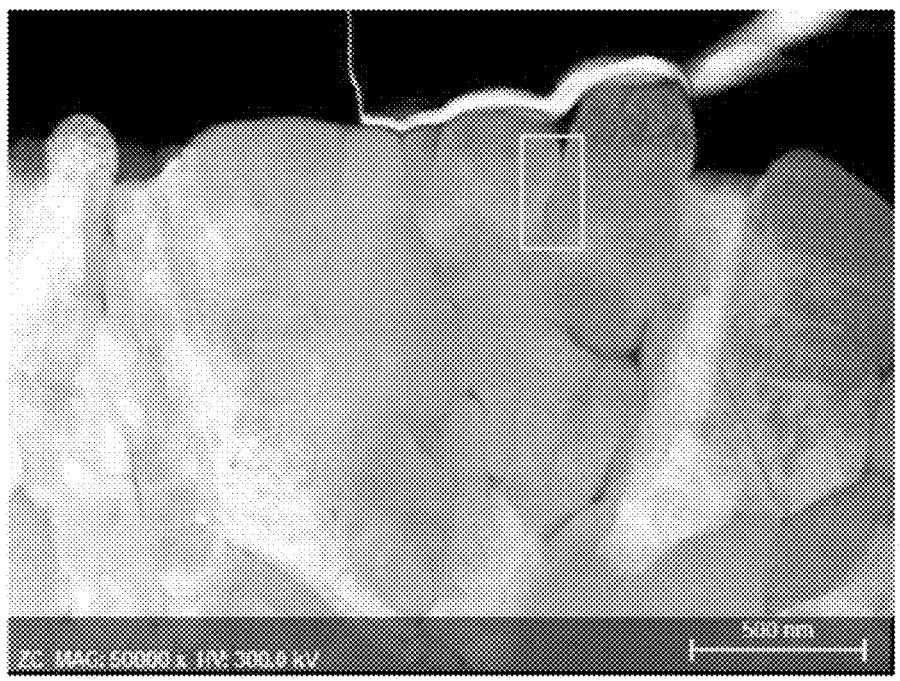
[FIG. 12b]
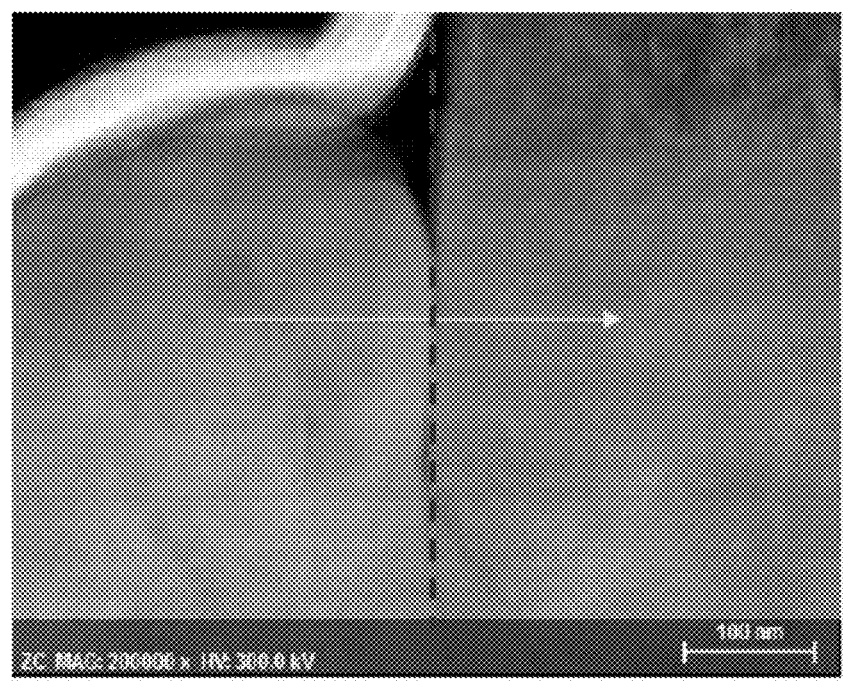

[FIG. 13a]
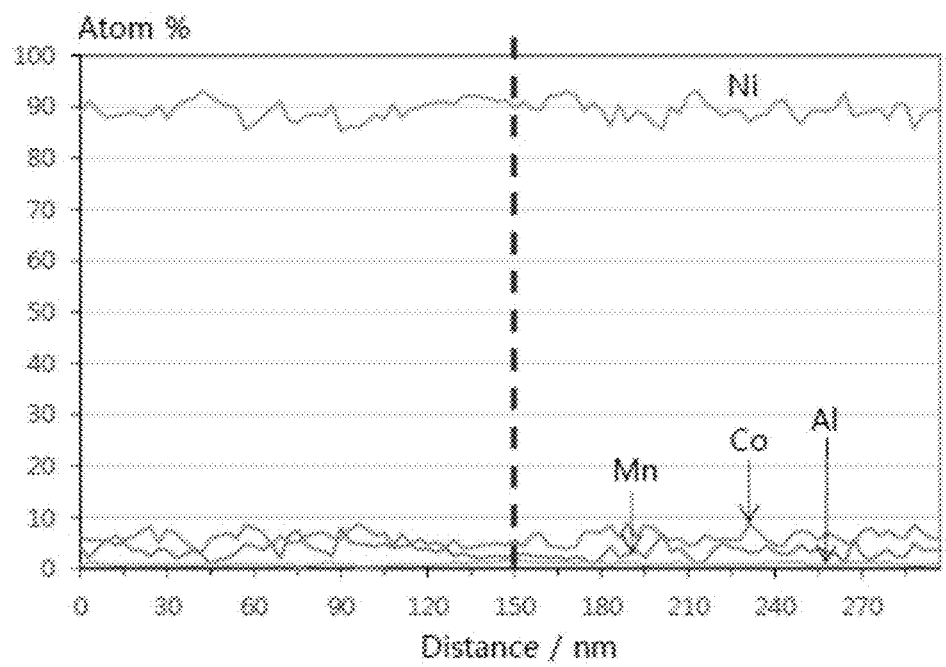
[FIG. 13b]
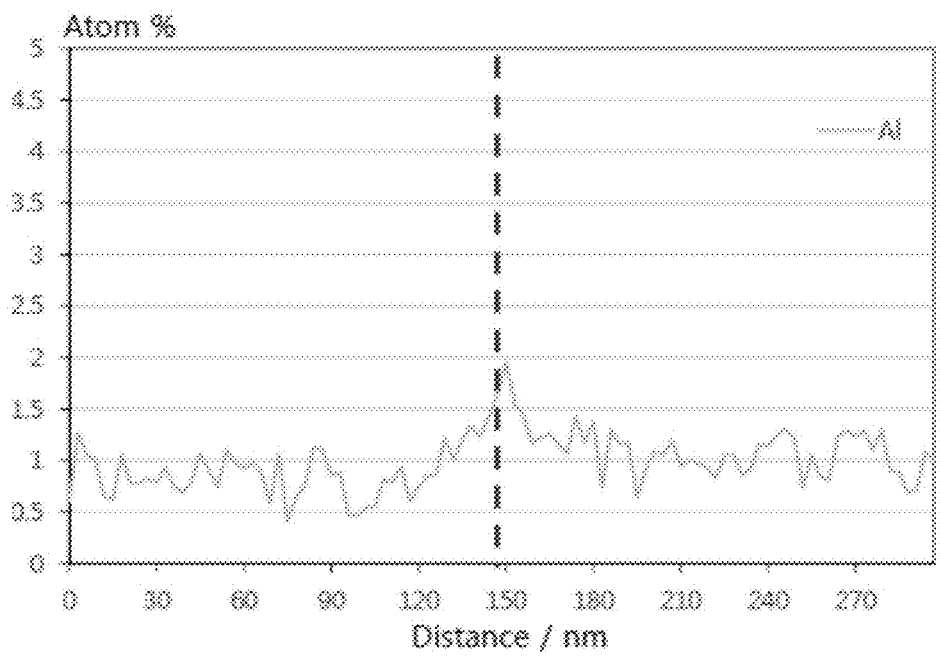

[FIG. 14a]
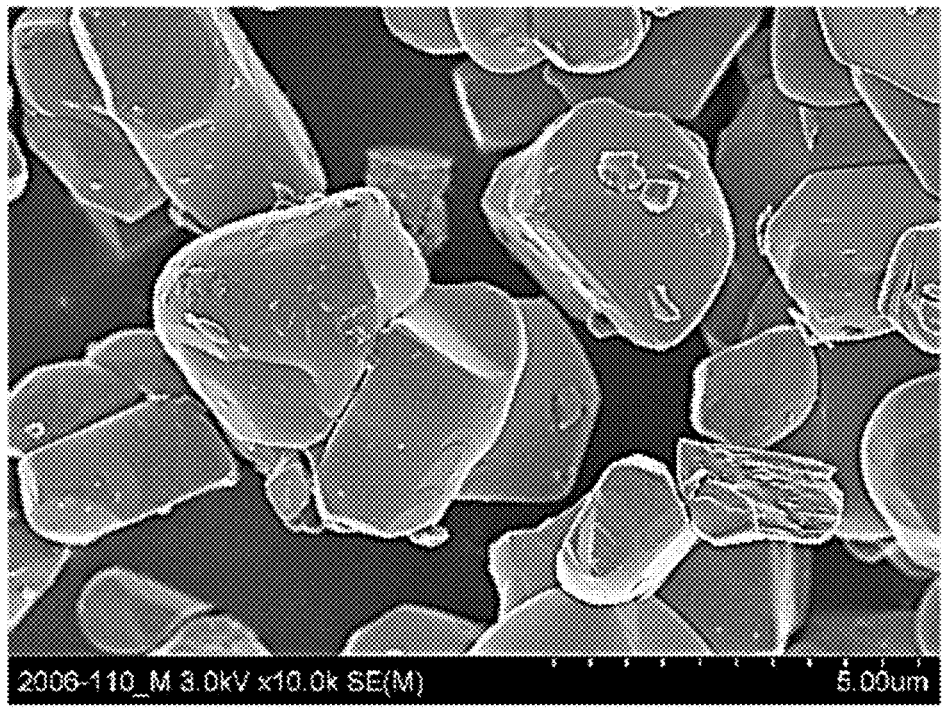
[FIG. 14b]
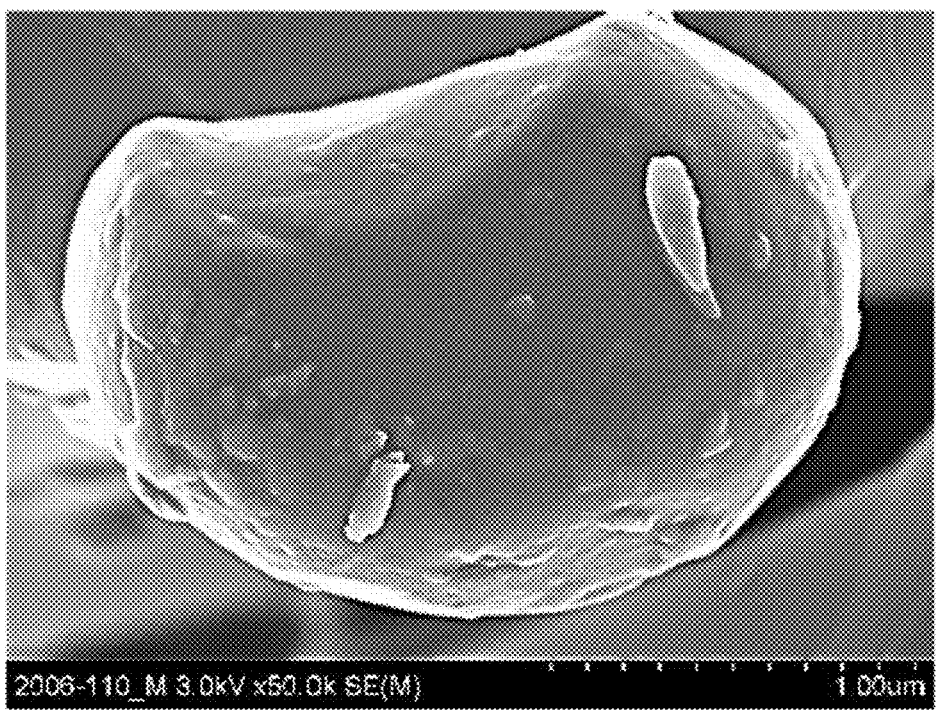

[FIG. 15a]
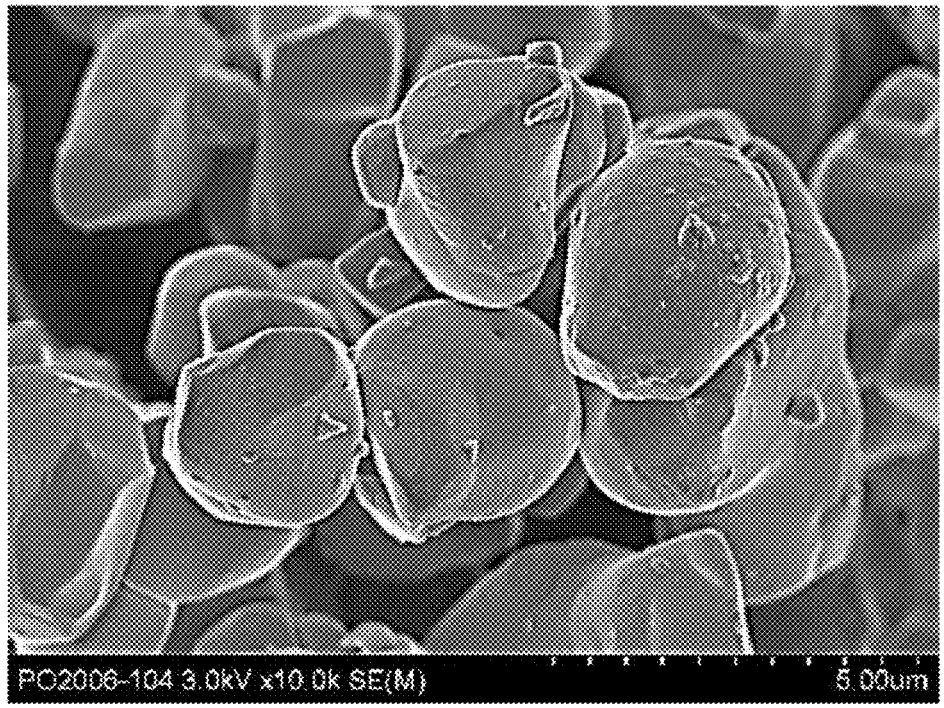
[FIG. 15b]
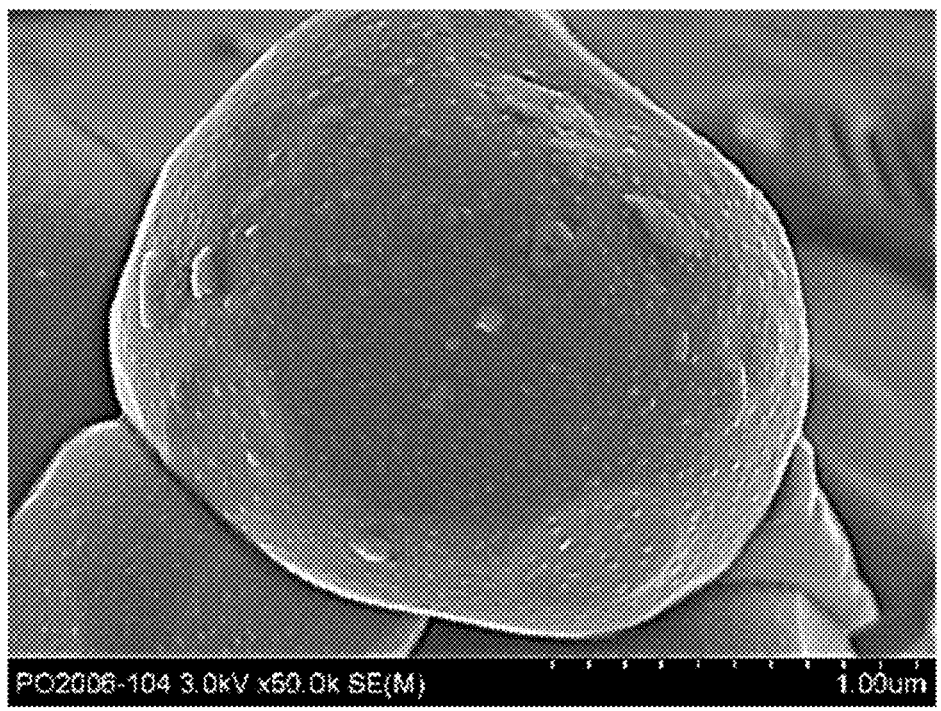

[FIG. 16a]
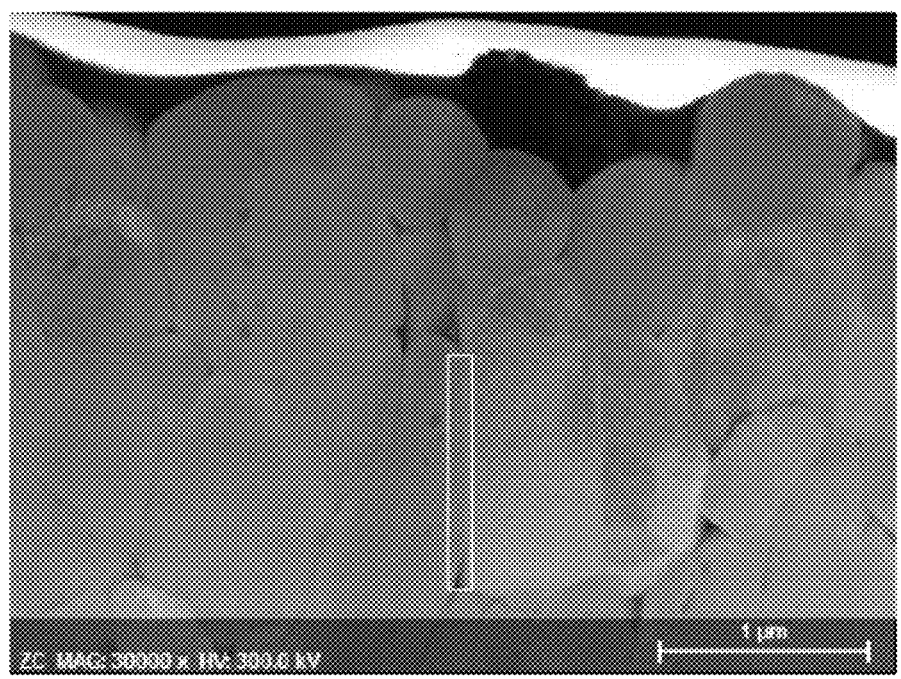
[FIG. 16b]
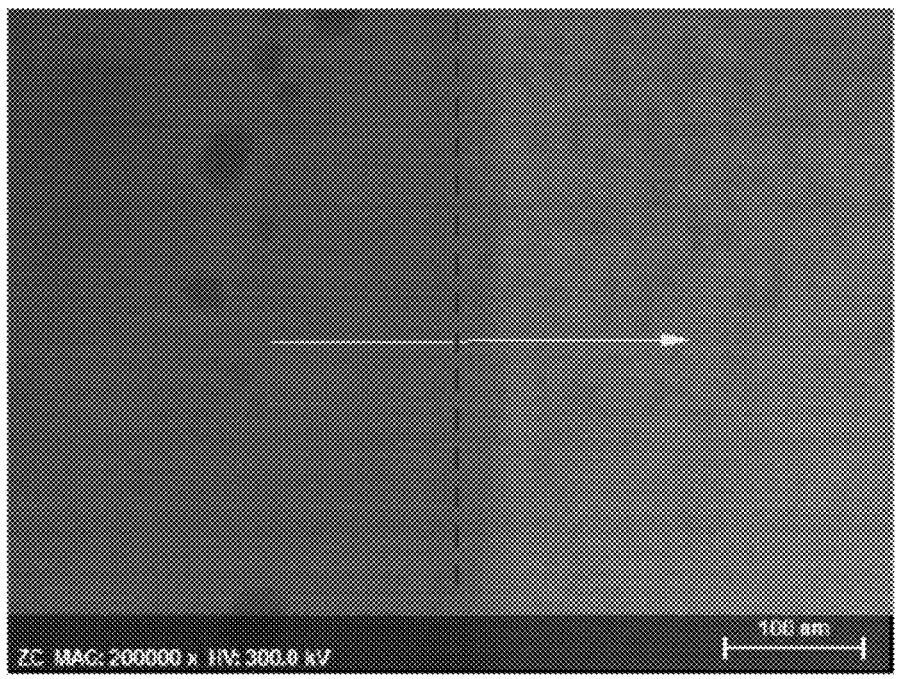

[FIG. 17]
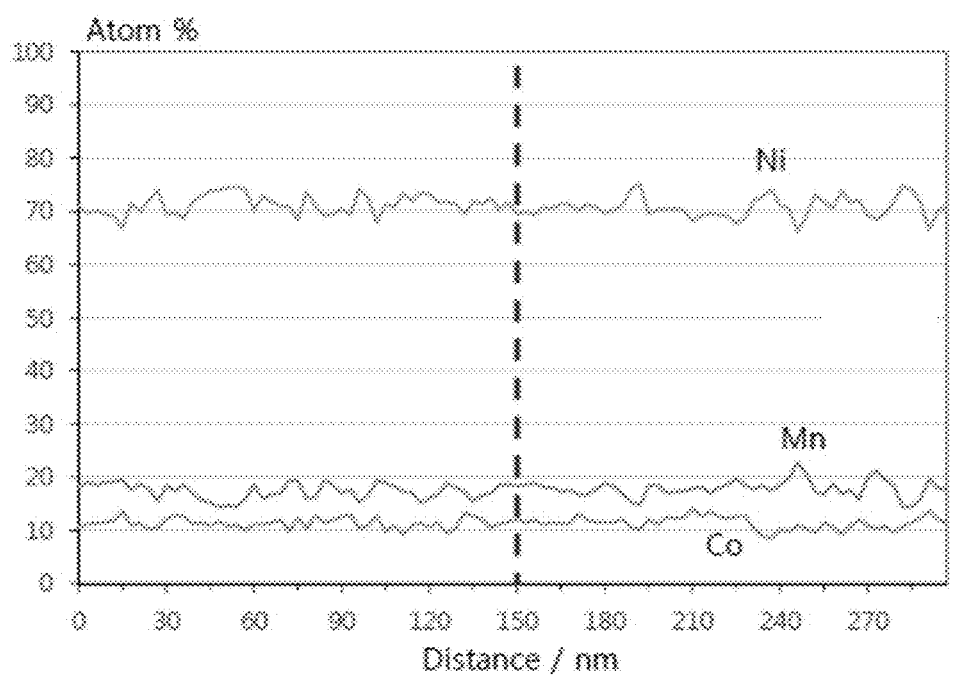

SECONDARY BATTERY ACTIVE MATERIAL

TECHNICAL FIELD

The present invention relates to an active material for a secondary battery, and more particularly to an active material for a secondary battery that contains an aggregate or a mixture of an aggregate with non-aggregated single particles and includes regions containing a relatively high content of additional elements in specific areas.

BACKGROUND ART

The expanded application of lithium secondary batteries, which were originally developed mainly for small electronic devices such as portable electronic devices and portable IT devices, to various fields including hybrid electric vehicles (HEVs), plug-in hybrid electric vehicles (PHEVs), electric vehicles (EVs) and the like, which have been commercialized to some extent, has brought about a great deal of attention on the development of large- and medium-sized secondary batteries such as energy storage systems (ESS).

Accordingly, there is a need for the development of lithium secondary batteries having excellent performance, and various attempts are being made to improve the characteristics of a cathode active material, which is a key material determining the performance of the lithium secondary batteries.

In one attempt, for example, $Li[Ni_xCo_yMn_{(1-x-y)}]O_2$ has been developed, but has a problem such as degradation of electrochemical performance due to cation mixing and formation of Ni—O, which hinders the movement of lithium ions. In particular, recently, the demand for a "high-nickel (high-Ni) cathode active material" having Ni content of 70% or more is increasing. As the Ni content increases, the above-mentioned problems become more severe. Therefore, the problem needs to be solved.

Accordingly, there is increasing need for novel methods to solve this problem.

DISCLOSURE

Technical Problem

Therefore, the present invention has been made to solve the above and other technical problems that have yet to be resolved.

Therefore, as a result of extensive research and various experimentation, the present inventors have found that, by forming a structure in which the relative content of an additional element is increased in specific regions of lithium transition metal oxide particles containing lithium, a transition metal and the additional element, various electrochemical properties such as cycle characteristics can be improved, and a decrease in the performance of the active material can be inhibited by the specific regions even if the particles of the active material are broken by an external impact and the single particles are isolated. Based on this finding, the present invention has been completed.

Technical Solution

In accordance with an aspect of the present invention, provided is an active material for a secondary battery,
the active material containing an aggregate including a plurality of single particles, or a mixture of the aggregate with non-aggregated single particles,
the active material including a first region having a relatively high content of an additional element (X) and a second region having a relatively low content of the additional element (X),
wherein the first region is at least one region of a grain boundary formed whereby the surfaces of the single particles constituting the aggregate contact one another and a void (pore or gap) between the single particles, and/or a surface area of each single particle,
wherein the additional element (X) contains at least one selected from the group consisting of Zr, Ti, Al, W, B, P, Mn, Ni, Mg, Cr, Ca, V, Sr, Y, F, Zn, Ga, Sn, Ru, Ce, La, and Si.

In general, an aggregate includes two or more single particles. When the single particles constitute the aggregate, the grain boundaries may be formed while the surfaces of the single particles are brought into contact with one another, and voids (pores and gaps), which are areas where the single particles do not contact one another, may be formed. More details of aggregates and single particles will be given in the following description with reference to the drawings and the like.

As defined above, the first region may be a region having a relatively high content of the additional element (X), and may be a grain boundary or void between single particles, the surface of single particles, or the like.

The second region is a region having a relatively low content of the additional element (X) compared to the first region. When the first region is determined according to the content of the additional element (X), the second region may be determined from a region excluding the first region, for example, it may be inside the single particle.

When the grain boundary is the first region, the first region may include the outermost surfaces of the single particles that are in contact with one another, and a region extending to a specific depth from the outermost surface of each particle in the central direction. That is, a first region similar to the coating layer may be formed at the grain boundary by concentrating the additional element (X) on the outermost surface of the single particle depending on conditions such as the calcination temperature applied during the production of the active material, but as the additional element (X) diffuses into the particle, like doping, a first region having a relatively high content of the additional element (X) may be formed down to a certain depth, whereas a second region having a relatively low content may be formed in the remaining portion. In this case, the additional element (X) may be uniformly present in the entirety of the second region, or the additional element (X) may be present in the region close to the first region, but may not be present in the region close to the center. In this structure, the second region may be also referred to as a "core" and the first region, having a high content of the additional element (X), may be also referred to as a "coating layer", a "doping portion", a "surface portion", or the like.

It can be inferred from a technical point of view that, without affecting the scope of the present invention, as the additional element (X) diffuses and moves along the grain boundary, the first region is formed in the form of a coating layer at the grain boundary and the void. However, this is considered to be a doping region when taking into account the fact that a relatively low content of the additional element (X) is present in a single particle, and the principle of formation of the first and second regions. That is, it is expected that the coating layer and the doped region are simultaneously formed by diffusion.

For example, when the first region is the surface region of the single particle, the additional element (X) may be doped into the single particle such that the content of the additional element (X) continuously or discontinuously decreases from the surface of the single particle to the center of the single particle, or a compound containing an additional element (X) may form a coating layer in all or part of the surface of the single particle.

The single particles may be formed of a single crystal or a polycrystal.

Many methods related to formation of a coating layer on the active material are well known. However, in the methods according to the prior art, the coating layer is formed only on the outermost surface of the aggregate, and is not formed between single particles. Therefore, when the aggregate is broken by an external force, the surface of the single particles is exposed to the outside as it is, so it is impossible to realize the effect of the coating layer, and various problems such as deterioration of electrical properties and side reactions occur.

On the other hand, when the first region is formed between the single particles constituting the aggregate, as in the present invention, the properties of coating and doping can be simultaneously achieved, and even if the aggregate is broken by an external force, the first region is formed on the surface of the single particle, so it is possible to prevent the above-mentioned problems from occurring because the surface of the single particle is not directly exposed to the outside.

In a specific embodiment, the difference in the content of the additional element (X) between the first region and the second region may be 10% or more, preferably 20% or more, and more preferably 25% or more. Also, it can be seen from the results of analysis in the examples that the first region is formed to a maximum depth of 30 nm from the surface of each single particle based on the grain boundary at which adjacent single particles contact each other. The depth of the first region can be adjusted as needed by controlling factors such as the particle size of the aggregate, pH, calcination temperature, calcination time, and type of raw materials.

In general, the size of the aggregate varies from several micrometers (μm) to several tens of micrometers (μm) depending on the size of the single particle, the number of single particles constituting the aggregate, and the like, and the single particle constituting the aggregate has a size of less than 1 μm. The structure of such an aggregate corresponds to a structure naturally formed on the basis of manufacturing principles, and most cation electrode active materials have such an aggregate structure.

The aggregate is produced by calcining a mixture of a transition metal precursor with a lithium raw material (LiOH, $Li_2CO_3$, etc.), and the transition metal precursor used as a raw material has an aggregate structure. That is, small particles having a size less than 1 μm aggregate and grow to form a transition metal precursor, and the active material obtained by calcining the mixture of the transition metal precursor with the lithium raw material also generally has the same aggregate structure.

Unlike the LCO active material, the cathode active material containing nickel causes various problems when calcined at a high temperature, so calcination is carried out at a relatively low temperature of about 700° C. to 800° C. The aggregate structure is maintained in this temperature range, so the active material also has the same structure.

In an experimental attempt to use non-aggregated single particles, rather than general aggregates, as an active material, the present applicant applied the present invention to non-aggregated single particles. The results are shown in Examples 4 and 6. In other words, the first region and the second region of the present invention can be applied not only to general aggregates but also to non-aggregated single particles. Of course, these are applicable even when the aggregate is formed such that the particle size exceeds 1 μm.

With regard to the relationship between single particles and aggregates, the grain boundaries and voids will be described in more detail below with reference to the experimental results of examples.

As can be seen from the SEM image of FIG. 1, showing the cross-section of the aggregate in the active material prepared in Example 3, which will be described later, single particles having a size less than 1 μm are in close contact with one another, and this particle structure is similar to the general structure of cation active materials. A grain boundary is formed in a region where single particles are in close contact with one another, as shown in "A" of FIG. 1, and a void is formed in a region where single particles are not in close contact with one another due to the shape of the single particles, as shown in "B" of FIG. 1.

FIGS. 2 and 3 are SEM images showing the cross-section of the aggregate in the active material prepared in Example 4. FIGS. 2 and 3 are images at a magnification of 50,000×, like FIG. 1. It can be seen that the size of the single particles is very large in FIGS. 2 and 3, compared to FIG. 1.

Unlike FIG. 1, FIGS. 2 and 3 show that the size of the single particles is 1 μm or more, and that most of the single particles are in a form that is sandwiched rather than being in close contact with one another, so gaps may be formed between the single particles, and some single particles are in a form such that interfaces thereof contact one another, so grain boundaries may be formed therebetween. This is a phenomenon that occurs because the shapes of the active material particles prepared in Example 4 and Example 1 are different.

Example 4 is performed to prepare non-aggregated single particles that are not aggregates, and Example 1 is performed to prepare aggregates. All of the active materials prepared in Example 1 are aggregates, so an image like that shown in FIG. 1 is obtained no matter which kind of particle is selected. However, in Example 4, non-aggregated single particles were prepared, but aggregates, in which some single particles are not separated from one another but remain adhered to one another, are inevitably obtained, as shown in FIGS. 2 and 3, due to technical limitations.

The images of the non-aggregated single particles prepared in Example 6 are shown in FIGS. 14A, 14B, 15A, and 15B. Examples 4 and 6 both show prepared non-aggregated single particles, but most of the prepared active materials, as shown in FIGS. 14A, 14B, 15A and 15B, appear in the form of non-aggregated single particles, and some small amounts thereof appear in the form of aggregates, as shown in FIGS. 2 and 3. That is, in order to obtain non-aggregated single particles, the single particles are controlled so as not to aggregate with one another, and aggregated single particles are pulverized/crushed so as to be separated from one another, but not all aggregates are prepared into non-aggregated single particles.

Accordingly, in a specific embodiment, the active material of the present invention contains a mixture of aggregates and non-aggregated single particles, and the size of the non-aggregated single particles may be 1 μm or more.

Referring to FIG. 2 again, it can be seen that small particles (G) having a size of about 500 nm are positioned between particles (H, I, J, K), which are larger than 1 μm.

These small particles (G) appear to be separate from the large particles (H, I, J, K), but it can be seen that the G particle is integrally connected to the H particle at the 'D' position. That is, it can be said that the G particle is not in contact with the H particle, but is actually part of the H particle. Although not shown in the drawings, the small particle may be sandwiched between the large particles.

A gap (C) in the form of a crack is formed between the G and I particles, and a pore (B) in the form a hole is formed between the G, I and K particles. It can be seen that the void according to the present invention may be a crack-shaped gap, a hole-shaped pore, or both.

The active material of FIG. 1 has a structure in which single particles densely aggregate and grow, so grain boundaries are formed at the region where adjacent single particles come into contact with each other, but the active materials of FIGS. 2 and 3 have a structure in which independently grown single particles aggregate, so the single particles may be spaced apart from one another rather than being in close contact with one another, to form voids B and C. Grain boundaries will be formed in the areas where the single particles closely contact each other or on the surface at which the interface between adjacent single particles begin to be integrated at a high calcination temperature, but it is necessary to distinguish between the grain boundaries and the voids, which are different from each other. The present applicant has found that the first and second regions are formed even in aggregates that are inevitably generated when non-aggregated single particles having a size of 1 μm or larger are prepared.

The additional element (X), as defined above, may include at least one selected from the group consisting of Zr, Ti, Al, W, B, P, Mn, Ni, Mg, Cr, Ca, V, Sr, Y, F, Zn, Ga, Sn, Ru, Ce, La, and Si. Among them, the additional element (X) may include at least one selected from the group consisting of Zr, Ti, Al, W, B, and P, and these elements may be more preferable for the following reasons.

Zr has the effect of improving structural stability and thermal properties by inhibiting cation mixing, and the effect of improving lifespan characteristics by inhibiting structural collapse occurring on the particle surface through structural stabilization. In addition, when water washing is applied to the preparation process, the surface resistance of the active material is reduced, the reduction of the capacity is suppressed, and side reactions with the electrolyte are inhibited.

Ti can improve electrochemical properties and thermal stability, reduce structural instability due to side reactions with electrolytes, and improve the effect of protecting the surface of the active material particles from decomposition of the electrolyte. In addition, Ti can improve structural stability and lifespan characteristics, and reduce residual lithium.

Al can improve surface resistance, lithium ion reactivity, and thermal stability, reduce direct current internal resistance (DCIR), and improve lifespan characteristics. Also, Al can reduce internal resistance by stabilizing the layered structure, and can inhibit cation mixing.

W has excellent conductivity, and has effects of reducing byproducts through reaction with residual lithium, of improving interfacial properties by suppressing interfacial reactions, and of improving discharge capacity, output characteristics, and lifespan characteristics of lithium secondary batteries.

B can improve structural stability by improving particle strength, and has effects of suppressing cracks inside the particles over the lifetime thereof and of improving the ionic conductivity of the active material. In addition, B can reduce the formation of lithium byproducts and improve lifespan characteristics.

P has the effects of securing structural stability and improving the stability and lifespan characteristics of lithium secondary batteries by reducing residual lithium.

In a specific embodiment, based thereon, the case where the additional element (X) includes at least one selected from the group consisting of Zr, Ti, Al and W, and the case where the additional element (X) includes at least one selected from the group consisting of B and P may be considered.

The additional element (X) may be present in the form of an element and/or a compound. When the additional element (X) is present in the form of a compound, it may include lithium and transition metals such as nickel. The compound may be a compound containing lithium and nickel and having a high content of the additional element (X), or may be a compound containing no lithium and/or a transition metal.

In a specific embodiment, the active material for a secondary battery of the present invention may have a composition of Formula 1 below:

$$Li_a[M_{1-b}X_b]O_{c-d}Q_d \qquad (1)$$

wherein M is $Ni_xCo_yMn_z$;

X includes at least one selected from the group consisting of Zr, Ti, Al, W, B, P, Co, Mn, Ni, Mg, Cr, Ca, V, Sr, Y, F, Zn, Ga, Sn, Ru, Ce, La, and Si;

Q includes at least one of F, P and S;

a, b, c and d satisfy $0.8 \leq a \leq 1.2$, $0 < b \leq 0.5$, $1.8 < c < 2.2$, and $0 \leq d < 0.2$, respectively; and x, y and z satisfy $0 < x \leq 1$, $0 \leq y < 1$, and $0 \leq z < 1$, respectively, with the proviso that $0 < x+y+z \leq 1$ is satisfied.

For reference, when the content of Co and/or Mn in M exceeds 0, these elements are excluded from X.

In a specific embodiment, X includes at least one of Zr, Ti, Al, W, B, and P, and x satisfies $0.7 \leq x < 1$.

The distribution of the content of the element (X) in the particles having the composition may be analyzed using an energy-dispersive X-ray spectrometer (EDX), an electron probe X-ray micro-analyzer (EPMA), or the like.

The active material according to the present invention may be prepared by mixing a metal hydroxide or oxide precursor containing one or more transition metals, a lithium raw material containing lithium, and a raw material containing an additional element (X), followed by calcination.

The present invention also provides a lithium secondary battery including the active material for the secondary battery. The configuration and production method of the lithium secondary battery are known in the art and thus a detailed description thereof will be omitted herein.

Effects of the Invention

As described above, the active material for the secondary battery according to the present invention exhibits excellent electrochemical characteristics such as cycle characteristics due to the relatively high content of the additional element (X) in specific regions, and suppresses a decrease in the performance of the active material through the specific regions even if the particles of the active material are broken by an external impact and the single particles are isolated.

DESCRIPTION OF THE DRAWINGS

FIG. 1 is an SEM image showing a cross-section of an aggregate in the active material prepared in Example 3;

FIGS. 2 and 3 are SEM images showing cross-sections of aggregates in the active material prepared in Example 4;

FIGS. 4A and 4B, and FIGS. 5A and 5B illustrate the results of EDX analysis of the cross-section of the particle obtained through pulverization of the active material prepared in Example 1;

FIG. 6 and FIGS. 7A and 7B illustrate the results of EDX analysis of the cross-section of the particle obtained through pulverization of the active material prepared in Example 2;

FIGS. 8A and 8B and FIGS. 9A and 9B illustrate the results of EDX analysis of the cross-section of the particle obtained through pulverization of the active material prepared in Example 3;

FIGS. 10A and 10B and FIGS. 11A and 11B illustrate the results of EDX analysis of the cross-section of the particle obtained through pulverization of the active material prepared in Example 4;

FIGS. 12A and 12B and FIGS. 13A and 13B illustrate the results of EDX analysis of the cross-section of the particle obtained through pulverization of the active material prepared in Example 5;

FIGS. 14A and 14B and FIGS. 15A and 15B illustrate the results of EDX analysis of the cross-section of the particle obtained through pulverization of the active material prepared in Example 6; and FIGS. 16A and 16B and FIG. 17 illustrate the results of EDX analysis of the cross-section of the particle obtained through pulverization of the active material prepared in Comparative Example 1.

BEST MODE

Now, the present invention will be described in more detail with reference to the following examples. These examples should not be construed as limiting the scope of the present invention.

For reference, in Examples 1 to 6 and Comparative Examples 1 to 3, which will be described later, in order to compare the effects of the first and second regions, the cleaning process was not applied.

[Example 1]—Preparation of High-Ti
$Li_{1.03}Ni_{0.7}Co_{0.0925}Mn_{0.1925}Ti_{0.015}O_2$ NiSO$_4$ as a nickel precursor, CoSO$_4$ as a cobalt precursor, and MnSO$_4$ as a manganese precursor were added at a molar ratio of 0.7:0.1:0.2 to water to prepare an aqueous nickel-cobalt-manganese hydroxide precursor solution.

An aqueous solution of sodium hydroxide was slowly added dropwise to the aqueous solution while being stirred for 15 hours to neutralize the aqueous precursor solution thereby to precipitate $Ni_{0.7}Co_{0.1}Mn_{0.2}(OH)_2$ as nickel-cobalt-manganese hydroxide.

The precursor (nickel-cobalt-manganese hydroxide) thus obtained was mixed with LiOH at a ratio of Li/Me of 1.03 and with TiO$_2$ at a molar ratio of Ni:Co:Mn:Ti of 0.7:0.0925:0.1925:0.015, the temperature was elevated to 800° C. at an elevation rate of about 2° C./min, and the resulting mixture was heat-treated for about 15 hours, cooled to 600° C., heat-treated at 600° C. for 2 hours while cooled in a furnace, cooled to 400° C., heat-treated at 400° C. for 2 hours while cooled in the furnace, and then allowed to cool to room temperature to prepare $Li_{1.03}Ni_{0.7}Co_{0.0925}Mn_{0.1925}Ti_{0.015}O_2$.

The prepared active material was pulverized, the cross-section of the obtained particle was analyzed by EDX, and the results are shown in FIGS. 4A and 4B and FIGS. 5A and 5B.

As can be seen from FIGS. 4A and 4B, and FIGS. 5A and 5B, the Ti content in the grain boundaries formed between the single particles is higher than the Ti content in the single particles.

[Example 2]—Preparation of High-W
$Li_{1.03}Ni_{0.7}Co_{0.0925}Mn_{0.1925}W_{0.015}O_2$ The precursor (nickel-cobalt-manganese hydroxide) obtained in the same manner as in Example 1 was mixed with LiOH at a ratio of Li/Me of 1.03 and with WO$_3$ at a molar ratio of Ni:Co:Mn:W of 0.7:0.0925:0.1925:0.015, the temperature was elevated to 800° C. at an elevation rate of about 2° C./min, and the resulting mixture was heat-treated for about 15 hours, cooled to 600° C., heat-treated at 600° C. for 2 hours while cooled in a furnace, cooled to 400° C., heat-treated at 400° C. for 2 hours while cooled in the furnace, and then allowed to cool to room temperature to prepare $Li_{1.03}Ni_{0.7}Co_{0.0925}Mn_{0.1925}W_{0.015}O_2$.

The prepared active material was pulverized, the cross-section of the obtained particle was analyzed by EDX, and the results are shown in FIG. 6 and FIGS. 7A and 7B.

As can be seen from FIG. 6 and FIGS. 7A and 7B, the W content in the grain boundaries formed between the single particles is higher than the W content in the single particles.

[Example 3]—Preparation of High-Zr
$Li_{1.03}Ni_{0.82}Co_{0.09485}Mn_{0.06485}Zr_{0.0203}O_2$ NiSO$_4$ as a nickel precursor, CoSO$_4$ as a cobalt precursor, and MnSO$_4$ as a manganese precursor were added at a molar ratio of 0.82:0.1:0.08 to water to prepare an aqueous nickel-cobalt-manganese hydroxide precursor solution.

An aqueous solution of sodium hydroxide was slowly added dropwise to the aqueous solution while being stirred for 15 hours to neutralize the aqueous precursor solution thereby to precipitate $Ni_{0.82}Co_{0.01}Mn_{0.08}(OH)_2$ as nickel-cobalt-manganese hydroxide.

The precursor (nickel-cobalt-manganese hydroxide) thus obtained was mixed with LiOH at a ratio of Li/Me of 1.03 and with ZrO$_3$ at a molar ratio of Ni:Co:Mn:Zr of 0.82:0.09485:0.06485:0.0203, the temperature was elevated to 780° C. at an elevation rate of about 2° C./min, and the resulting mixture was heat-treated for about 15 hours, cooled to 600° C., heat-treated at 600° C. for 2 hours while cooled in a furnace, cooled to 400° C., heat-treated at 400° C. for 2 hours while cooled in the furnace, and then allowed to cool to room temperature to prepare $Li_{1.03}Ni_{0.82}Co_{0.09485}Mn_{0.06485}Zr_{0.0203}O_2$.

The prepared active material was pulverized, the cross-section of the obtained particle was analyzed by EDX, and the results are shown in FIGS. 8A and 8B and FIGS. 9A and 9B.

In addition, an SEM image of the cross-section of the prepared aggregate of the active material is shown in FIG. 1.

As can be seen from FIGS. 8A and 8B, and FIGS. 9A and 9B, the Zr content in the grain boundaries formed between the single particles is higher than the Zr content in the single particles.

[Example 4]—Preparation of High-P
$Li_{1.03}Ni_{0.82}Co_{0.09485}Mn_{0.06485}P_{0.0203}O_2$ The precursor (nickel-cobalt-manganese hydroxide) obtained in the same manner as in Example 3 was mixed with LiOH at a ratio of Li/Me of 1.03, the temperature was elevated to 880° C. at an elevation rate of about 2° C./min, and the resulting mixture was heat-treated for about 10 hours, cooled to 700° C., heat-treated at 700° C. for 2 hours while cooled in a furnace, cooled to 400° C., heat-treated at 400° C. for 2 hours while cooled in the furnace, and then allowed to cool to room temperature to prepare $Li_{1.03}Ni_{0.82}Co_{0.1}Mn_{0.08}O_2$.

The prepared active material of $Li_{1.03}Ni_{0.82}Co_{0.1}Mn_{0.08}O_2$ was mixed with $(NH_4)_3PO_4$ to obtain $Li_{1.03}Ni_{0.82}Co_{0.9485}Mn_{0.06485}P_{0.0203}O_2$, the temperature was elevated to 500° C. at an elevation rate of about 2° C./min, and the resulting mixture was heat-treated for about 6 hours, cooled to 200° C., heat-treated at 400° C. for 1 hour while cooled in a furnace, and then allowed to cool to room temperature to prepare $Li_{1.03}Ni_{0.82}Co_{0.09485}Mn_{0.06485}P_{0.0203}O_2$.

The prepared active material was pulverized, the cross-section of the obtained particle was analyzed by EDX, and the results are shown in FIGS. 10A and 10B and FIGS. 11A and 11B.

In addition, SEM images of the cross-section of the prepared aggregate of the active material are shown in FIGS. 2 and 3.

Specifically, FIGS. 10A and 10B illustrate the state in which a plurality of single particles aggregates. However, the images of FIGS. 10A and 10B, unlike other embodiments, show that single particles having a large size of 1 μm or more, rather than small single particles having a size of less than 1 μm, aggregate. This means the state of some aggregated particles that were inevitably generated when non-aggregated single particles are prepared.

That is, in Example 4, non-aggregated single particles, rather than aggregates, were prepared, and the cross-sectional state of some aggregates inevitably generated during this process is shown in FIGS. 10A and 10B. As described above, such aggregates are in the state in which the particles are sandwiched rather than being in close contact with one another, and voids are formed between adjacent single particles. As a result, in Example 4, an active material containing a majority of non-aggregated single particles and a minority of aggregated single particles was prepared.

As can be seen from FIGS. 10A and 10B and FIGS. 11A and 11B, the P content of the voids formed between the single particles is higher than the P content inside the single particles, which supports that the same characteristics appear even in some aggregates that were inevitably generated when non-aggregated single particles were prepared.

[Example 5]—Preparation of High-Al $Li_{1.03}Ni_{0.9}Co_{0.045}Mn_{0.045}Al_{0.01}O_2$ $NiSO_4$ as a nickel precursor, $CoSO_4$ as a cobalt precursor, and $MnSO_4$ as a manganese precursor were added at a molar ratio of 0.90:0.005:0.04 to water to prepare an aqueous nickel-cobalt-manganese hydroxide precursor solution.

An aqueous solution of sodium hydroxide was slowly added dropwise to the aqueous solution while being stirred for 15 hours to neutralize the aqueous precursor solution thereby to precipitate $Ni_{0.90}Co_{0.05}Mn_{0.04}(OH)_2$ as nickel-cobalt-manganese hydroxide.

The precursor (nickel-cobalt-manganese hydroxide) thus obtained was mixed with LiOH at a ratio of Li/Me of 1.03 and with $Al(OH)_3$ at a molar ratio of Ni:Co:Mn:Al of 0.90:0.045:0.045:0.01, the temperature was elevated to 730° C. at an elevation rate of about 2° C./min, and the resulting mixture was heat-treated for about 15 hours, cooled to 600° C., heat-treated at 600° C. for 2 hours while cooled in a furnace, cooled to 400° C., heat-treated at 400° C. for 2 hours while cooled in the furnace, and then allowed to cool to room temperature to prepare $Li_{1.03}Ni_{0.9}Co_{0.45}Mn_{0.045}Al_{0.01}O_2$.

The prepared active material was pulverized, the cross-section of the obtained particle was analyzed by EDX, and the results are shown in FIGS. 12A and 12B and FIGS. 13A and 13B.

As can be seen from FIGS. 12A and 12B and FIGS. 13A and 13B, the Al content in the grain boundaries formed between the single particles is higher than the Al content in the single particles.

[Example 6]—Preparation of High-B $Li_{1.03}Ni_{0.90}Co_{0.455}Mn_{0.045}B_{0.01}$ The precursor (nickel-cobalt-manganese hydroxide) obtained in the same manner as in Example 5 was mixed with LiOH at a ratio of Li/Me of 1.03, the temperature was elevated to 880° C. at an elevation rate of about 2° C./min, and the resulting mixture was heat-treated for about 10 hours, cooled to 700° C., heat-treated at 700° C. for 2 hours while cooled in a furnace, cooled to 400° C., heat-treated at 400° C. for 2 hours while cooled in the furnace, and then allowed to cool to room temperature to prepare $Li_{1.03}Ni_{0.90}Co_{0.05}Mn_{0.05}O_2$.

The prepared active material of $Li_{1.03}Ni_{0.90}Co_{0.05}Mn_{0.05}O_2$ was mixed with $H_3BO_3$ (boric acid) to obtain $Li_{1.03}Ni_{0.90}Co_{0.045}Mn_{0.045}B_{0.01}O_2$, the temperature was elevated to 300° C. at an elevation rate of about 2° C./min, and the resulting mixture was heat-treated for about 6 hours, cooled to 200° C., heat-treated at 200° C. for 1 hour while cooled in a furnace, and then allowed to cool to room temperature to prepare $Li_{1.03}Ni_{0.90}Co_{0.045}Mn_{0.045}B_{0.01}O_2$.

FIGS. 14A and 14B are SEM images showing the surface of non-aggregated single particles obtained by pulverizing the prepared active material of $Li_{1.03}Ni_{0.90}Co_{0.05}Mn_{0.05}O_2$ before mixing with $H_3BO_3$ (boric acid), and FIGS. 15A and 15B are SEM images showing the surface of non-aggregated single particles obtained by pulverizing the prepared active material of $Li_{1.03}Ni_{0.90}Co_{0.045}Mn_{0.045}B_{0.01}O_2$.

It is impossible to analyze B using EDX, so the surface change was observed when the type of the additive element was changed using the same preparation method as in Example 4. That is, it can be seen from Example 4 that the first region having a relatively high P content and the second region having a relatively low P content were formed in the non-aggregated single particles, which indirectly means that if a change occurs when using B in the same manner as above, the first region and the second region are formed.

Comparing FIG. 14B with FIG. 15B, it can be seen that the surface of the single particle changes depending on whether or not $H_3BO_3$ (boric acid) is used. It can be seen that before $H_3BO_3$ (boric acid) was used, the surface of the single particles was smooth, whereas after it was used, small grains were dispersed at predetermined intervals over the entire surface of the particles. It can be seen from this that the grains are compounds containing B and the B content of the surface is higher than that of the inside.

When the single particles having the compound containing B on the surface thereof aggregate together, as shown in FIG. 10A of Example 4, grain boundaries/voids are formed therebetween and the B content of grain boundaries/voids is higher than that of the inside of the single particles based on the same principle.

[Comparative Example 1]—Preparation of $Li_{1.03}Ni_{0.7}Co_{0.1}Mn_{0.2}O_2$

The precursor (nickel-cobalt-manganese hydroxide) obtained in the same manner as in Example 1 was mixed with LiOH at a ratio of Li/Me of 1.03, the temperature was elevated to 800° C. at an elevation rate of about 2° C./min, and the resulting mixture was heat-treated for about 15 hours, cooled to 600° C., heat-treated at 600° C. for 2 hours while cooled in a furnace, cooled to 400° C., heat-treated at 400° C. for 2 hours while cooled in the furnace, and then allowed to cool to room temperature to prepare $Li_{1.03}Ni_{0.7}Co_{0.1}Mn_{0.2}O_2$.

The prepared active material was pulverized, the cross-section of the obtained particle was analyzed by EDX, and the results are shown in FIGS. 16A and 16B and FIG. 17.

[Comparative Example 2]—Preparation of $Li_{1.03}Ni_{0.82}Co_{0.11}Mn_{0.07}O_2$ The precursor (nickel-cobalt-manganese hydroxide) obtained in the same manner as in Example 3 was mixed with LiOH at a ratio of Li/Me of 1.03, the temperature was elevated to 780° C. at an elevation rate of about 2° C./min and the resulting mixture was heat-treated for about 15 hours, cooled to 600° C., heat-treated at 600° C. for 2 hours while cooled in a furnace, cooled to 400° C., heat-treated at 400° C. for 2 hours while cooled in the furnace, and then allowed to cool to room temperature to prepare $Li_{1.03}Ni_{0.82}Co_{0.11}Mn_{0.07}O_2$.

[Comparative Example 3]—Preparation of $Li_{1.03}Ni_{0.90}Co_{0.05}Mn_{0.005}O_2$ The precursor (nickel-cobalt-manganese hydroxide) obtained in the same manner as in Example 5 was mixed with LiOH at a ratio of Li/Me of 1.03, the temperature was elevated to 730° C. at an elevation rate of about 2° C./min, and the resulting mixture was heat-treated for about 15 hours, cooled to 600° C., heat-treated at 600° C. for 2 hours while cooled in a furnace, cooled to 400° C., heat-treated at 400° C. for 2 hours while cooled in the furnace, and then allowed to cool to room temperature to prepare $Li_{1.03}Ni_{0.90}Co_{0.05}Mn_{0.005}O_2$.

As can be seen from FIGS. 16A and 16B and FIG. 17, there is no particular difference between the content of the ingredient in the grain boundary formed between the single particles and the content of the ingredient in the single particle.

Experimental Example

The compound synthesized in each of Examples 1 to 6 and Comparative Examples 1 to 3, as a cation active material, Super-P as a conductive material, and PVdF as a binder were mixed at a weight ratio of 95:2:3 in the presence of N-methylpyrrolidone as a solvent to prepare a cathode active material slurry. The cathode active material slurry was applied onto an aluminum current collector, dried at 120° C., and then rolled to produce a cathode.

A porous polyethylene film as a separator was interposed between the cathode produced as described above and an anode as a Li metal to produce an electrode assembly, the electrode assembly was placed in a battery case, and an electrolyte was injected into the battery case to produce a lithium secondary battery. The electrolyte used herein was prepared by dissolving 1.0M lithium hexafluorophosphate ($LiPF_6$) in an organic solvent consisting of ethylene carbonate/dimethyl carbonate (mixed at a volume ratio of EC/DMC=1/1).

Each of the lithium secondary batteries thus produced was subjected to charge (at 0.1C, 4.3V) and discharge (at 0.1C, 3.0V), followed by charge (at 1.0C, 4.3V) and discharge (at 1.0C, 3.0V) 50 cycles at 45° C. The results are shown in Table 1 below.

TABLE 1

| | Type of active material | 4.3 V/3 V 0.1 C charge capacity (mAh/g) | 4.3 V/3 V 0.1 C discharge capacity (mAh/g) | 4.3 V/3 V 0.1 C charge/discharge efficiency (%) | Lifespan at 45° C. after 50 cycles (%) | Surface resistance (Ω) | Residual lithium (%) |
|---|---|---|---|---|---|---|---|
| Example 1 | $Li_{1.03}Ni_{0.7}Co_{0.0925}Mn_{0.1925}Ti_{0.015}O_2$ | 214.3. | 195.4 | 91.0 | 96.3 | 15 | 0.280 |
| Example 2 | $Li_{1.03}Ni_{0.7}Co_{0.0925}Mn_{0.1925}W_{0.015}O_2$ | 214.1 | 196.5 | 91.5 | 96.1 | 14 | 0.273 |
| Comparative Example 1 | $Li_{1.03}Ni_{0.7}Co_{0.1}Mn_{0.2}O_2$ | 215.1 | 197.3 | 91.7 | 95.5 | 17 | 0.405 |
| Example 3 | $Li_{1.03}Ni_{0.82}Co_{0.9485}Mn_{0.06485}Zr_{0.0203}O_2$ | 223.2 | 201.2 | 90.1 | 95.8 | 25 | 0.811 |
| Example 4 | $Li_{1.03}Ni_{0.82}Co_{0.9485}Mn_{0.06485}P_{0.0203}O_2$ | 222.7 | 201.7 | 90.6 | 95.2 | 31 | 0.617 |
| Comparative Example 2 | $Li_{1.03}Ni_{0.82}Co_{0.11}Mn_{0.07}O_2$ | 224.5 | 202.4 | 90.2 | 93.8 | 32 | 0.824 |
| Example 5 | $Li_{1.03}Ni_{0.9}Co_{0.045}Mn_{0.045}Al_{0.01}O_2$ | 231.4 | 208.6 | 90.1 | 94.5 | 50 | 1.220 |
| Example 6 | $Li_{1.03}Ni_{0.9}Co_{0.045}Mn_{0.045}B_{0.01}O_2$ | 231.7 | 208.2 | 89.9 | 94.3 | 53 | 0.982 |
| Comparative Example 3 | $Li_{1.03}Ni_{0.9}Co_{0.05}Mn_{0.005}O_2$ | 233.6 | 210.8 | 90.2 | 90.6 | 53 | 1.217 |

As can be seen from Table 1, the lithium secondary batteries of Examples 1 to 9 according to the present invention have excellent cycle life characteristics, low surface resistance, and a small amount of residual lithium on the surface, compared to the lithium secondary batteries of Comparative Examples 1 to 7.

Although preferred embodiments of the present invention have been disclosed for illustrative purposes, those skilled in the art will appreciate that various modifications, additions and substitutions are possible, without departing from the scope and spirit of the invention as disclosed in the accompanying claims

The invention claimed is:

1. An active material for a secondary battery,
the active material comprising aggregates, each including a plurality of single particles, or a mixture of the aggregates with non-aggregated single particles,
the active material comprising a first region having a relatively high content of an additional element (X) and a second region having a relatively low content of the additional element (X), wherein the first region is at least one region of a grain boundary formed whereby the surfaces of the single particles constituting the aggregate contact one another and a void, pore or gap between the single particles, and/or a surface region of each single particle, wherein the additional element (X) comprises at least one selected from the group consisting of Zr, Ti, Al, W, B, P, Mn, Ni, Mg, Cr, Ca, V, Sr, Y, F, Zn, Ga, Sn, Ru, Ce, La, and Si, and the void is a crack-shaped gap, a hole-shaped pore, or both thereof.

2. The active material according to claim 1, wherein, when the first region is the surface region of the single particle, the additional element (X) is doped into the single particle such that the content of the additional element (X) continuously or discontinuously decreases from the surface of the single particle to the center of the single particle, or a compound containing the additional element (X) forms a coating layer on an entirety or a part of the surface of the single particle.

3. The active material according to claim 1, wherein, with regard to a difference in content of the additional element (X) between the first region and the second region, a difference in an average content of the additional element (X) between the corresponding regions is 10% or more.

4. The active material according to claim 1, wherein the active material comprises a mixture of aggregates and non-aggregated single particles, and the size of the non-aggregated single particles is 1 μm or more.

5. The active material according to claim 1, wherein the first region is formed to a depth equal to or less than 30 nm from the surface of each single particle.

6. The active material according to claim 1, wherein the additional element (X) comprises Zr.

7. The active material according to claim 1, wherein the additional element (X) comprises Ti.

8. The active material according to claim 1, wherein the additional element (X) comprises Al.

9. The active material according to claim 1, wherein the additional element (X) comprises W.

10. The active material according to claim 1, wherein the additional element (X) comprises B.

11. The active material according to claim 1, wherein the additional element (X) comprises P.

12. The active material according to claim 1, wherein the active material has a composition of Formula 1 below:

$$Li_a[M_{1-b}X_b]O_{c-d}Q_d \qquad (1)$$

wherein M is $Ni_xCo_yMn_z$;

X comprises at least one selected from the group consisting of Zr, Ti, Al, W, B, P, Co, Mn, Ni, Mg, Cr, Ca, V, Sr, Y, F, Zn, Ga, Sn, Ru, Ce, La, and Si;

Q comprises at least one of F, P and S;

a, b, c and d satisfy 0.8≤a≤1.2, 0<b≤0.5, 1.8<c<2.2, and 0≤d<0.2, respectively; and x, y and z satisfy 0<x≤1, 0≤y<1, and 0≤z<1, respectively, with the proviso that 0<x+y+z≤1 is satisfied.

13. The active material according to claim 12, wherein X comprises at least one of Zr, Ti, Al, W, B, and P, and x satisfies 0.7≤x<1.

14. A lithium secondary battery comprising the active material according to claim 1.

15. An active material for a secondary battery, the active material comprising aggregates, each including a plurality of single particles, or a mixture of the aggregates with non-aggregated single particles, the active material comprising a first region having a relatively high content of an additional element (X) and a second region having a relatively low content of the additional element (X), wherein the first region is at least one region of a grain boundary formed whereby the surfaces of the single particles constituting the aggregate contact one another and a void (pore or gap) between the single particles, and/or a surface region of each single particle, wherein the additional element (X) comprises W.

16. The active material according to claim 15, wherein, when the first region is the surface region of the single particle, the additional element (X) is doped into the single particle such that the content of the additional element (X) continuously or discontinuously decreases from the surface of the single particle to the center of the single particle, or a compound containing the additional element (X) forms a coating layer on an entirety or a part of the surface of the single particle.

17. The active material according to claim 15, wherein the active material comprises a mixture of aggregates and non-aggregated single particles, and the size of the non-aggregated single particles is 1 μm or more.

18. An active material for a secondary battery, the active material comprising aggregates, each including a plurality of single particles, or a mixture of the aggregates with non-aggregated single particles, the active material comprising a first region having a relatively high content of an additional element (X) and a second region having a relatively low content of the additional element (X), wherein the first region is at least one region of a grain boundary formed whereby the surfaces of the single particles constituting the aggregate contact one another and a void (pore or gap) between the single particles, and/or a surface region of each single particle, wherein the additional element (X) comprises at least one selected from the group consisting of Zr, Ti, Al, W, B, P, Mn, Ni, Mg, Cr, Ca, V, Sr, Y, F, Zn, Ga, Sn, Ru, Ce, La, and Si, and the active material has a composition of Formula 1 below:

$$Li_a[M_{1-b}X_b]O_{c-d}Q_d \qquad (1)$$

wherein M is $Ni_xCo_yMn_z$;

X comprises at least one selected from the group consisting of Zr, Ti, Al, W, B, P, Co, Mn, Ni, Mg, Cr, Ca, V, Sr, Y, F, Zn, Ga, Sn, Ru, Ce, La, and Si;

Q comprises at least one of F, P and S;

a, b, c and d satisfy 0.8≤a≤1.2, 0<b≤0.5, 1.8<c<2.2, and 0≤d<0.2, respectively; and x, y and z satisfy 0<x≤1, 0≤y<1, and 0≤z<1, respectively, with the proviso that 0<x+y+z≤1 is satisfied.

19. The active material according to claim 18, wherein, when the first region is the surface region of the single particle, the additional element (X) is doped into the single particle such that the content of the additional element (X) continuously or discontinuously decreases from the surface of the single particle to the center of the single particle, or a compound containing the additional element (X) forms a coating layer on an entirety or a part of the surface of the single particle.

20. The active material according to claim 18, wherein the active material comprises a mixture of aggregates and non-aggregated single particles, and the size of the non-aggregated single particles is 1 μm or more.

* * * * *